US012748821B2

(12) United States Patent
Yang et al.

(10) Patent No.: US 12,748,821 B2
(45) Date of Patent: Sep. 29, 2026

(54) ANOMALY DETECTION AND ANOMALOUS PATTERNS IDENTIFICATION

(71) Applicant: INTERNATIONAL BUSINESS MACHINES CORPORATION, Armonk, NY (US)

(72) Inventors: Xi Yang, Apex, NC (US); Larisa Shwartz, Greenwich, CT (US); Ruchi Mahindru, Elmsford, NY (US); Ian Manning, Church Hill (IE); Ruchir Puri, Baldwin Place, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 17/737,065

(22) Filed: May 5, 2022

(65) Prior Publication Data

US 2023/0359706 A1 Nov. 9, 2023

(51) Int. Cl.

| | |
|---|---|
| ***G06F 18/213*** | (2023.01) |
| ***G06F 18/23213*** | (2023.01) |
| ***G06F 18/2415*** | (2023.01) |
| ***G06N 3/088*** | (2023.01) |
| ***G06N 3/0895*** | (2023.01) |

(52) U.S. Cl.

CPC ........ *G06F 18/2415* (2023.01); *G06F 18/213* (2023.01); *G06F 18/23213* (2023.01); *G06N 3/088* (2013.01); *G06N 3/0895* (2023.01)

(58) Field of Classification Search

CPC ............... G06F 18/2415; G06F 18/213; G06F 18/23213; G06N 3/088; G06N 3/0895

See application file for complete search history.

(56) References Cited

U.S. PATENT DOCUMENTS

| | | | |
|---|---|---|---|
| 7,483,934 | B1 | 1/2009 | Ide |
| 8,887,286 | B2 | 11/2014 | Dupont |

(Continued)

FOREIGN PATENT DOCUMENTS

| | | |
|---|---|---|
| KR | 102274389 B1 | 7/2021 |

OTHER PUBLICATIONS

Andridge et al., "A Review of Hot Deck Imputation for Survey Non-response", Int Stat Rev. Apr. 2010, 78(1): 40-64, 27 pages, <https://www.ncbi.nlm.nih.gov/pmc/articles/PMC3130338/>.

(Continued)

*Primary Examiner* — Sanchita Roy

(74) *Attorney, Agent, or Firm* — Monchai Chuaychoo

(57) ABSTRACT

An approach for end-to-end anomaly detection and anomalous patterns identification is disclosed. The approach leverages the use of a GMM-LASSO (a selection operator-type, Lasso-type, generalized method of moments (GMM) estimator) algorithm and proposes a feedback loop where the window (i.e., anomalous window) is detected and then it is used to detect the anomalous patterns. For example, the approach can classify one or more sequential data; generates one or more vectors based on the one or more sequential data; clusters the one or more vectors into one or more clusters; determines a membership of the one or more vectors associated with the one or more clusters; updates the one or more clusters; and optimizes the one or more clusters with respect to a predefined threshold.

20 Claims, 7 Drawing Sheets

(56) References Cited

U.S. PATENT DOCUMENTS

| | | | | |
|---|---|---|---|---|
| 8,949,677 | B1 | 2/2015 | Brundage | |
| 9,407,651 | B2 | 8/2016 | Mathis | |
| 9,509,710 | B1 | 11/2016 | Barry | |
| 9,652,354 | B2 | 5/2017 | Filimonov | |
| 9,833,196 | B2 | 12/2017 | Sarrafzadeh | |
| 10,891,545 | B2 | 1/2021 | Sun | |
| 2014/0096249 | A1 * | 4/2014 | Dupont | G06F 21/00 726/23 |
| 2015/0058982 | A1 * | 2/2015 | Eskin | G06F 16/84 726/23 |
| 2016/0359740 | A1 * | 12/2016 | Parandehgheibi | H04L 69/22 |
| 2019/0334759 | A1 | 10/2019 | Ray | |
| 2021/0357680 | A1 * | 11/2021 | Chen | G06V 10/7753 |

OTHER PUBLICATIONS

Beaulieu-Jones et al., "Missing data imputation in the electronic health record using deeply learned autoencoders", Pac Symp Biocomput. 2016; 22: 207-218, 15 pages, <https://pubmed.ncbi.nlm.nih.gov/27896976/>.

Dempster et al., "ROCKET: Exceptionally fast and accurate time series classification using random convolutional kernels", arXiv:1910.13051v1 [cs.LG], Oct. 29, 2019, pp. 1-27.

Galimard et al., "Heckman imputation models for binary or continuous MNAR outcomes and MAR predictors", BMC Medical Research Methodology, 2018, 13 pages, <https://bmcmedresmethodol.biomedcentral.com/articles/10.1186/s12874-018-0547-1>.

Garcia-Laencina et al., "Missing data imputation on the 5-year survival prediction of breast cancer patients with unknown discrete values", Computers in Biology and Medicine, Accepted Feb. 9, 2015, 9 pages, <https://www.sciencedirect.com/science/article/pii/S0010482515000554?casa_token=1RwQhfOjVFAAAAAA:nvCZY1knFmgNcwPd2Jnb8DDYBRPUvg9LAToqFGDdNU7QllrJWgQ_Ok81AT9KV3j4iEnTanJ05Q>.

Guo et al., "Robust Online Time Series Prediction with Recurrent Neural Networks," 2016 IEEE International Conference on Data Science and Advanced Analytics (DSAA), pp. 816-825.

Kim et al., "Temporal Belief Memory: Imputing Missing Data during RNN Training", Proceedings of the Twenty-Seventh International Joint Conference on Artificial Intelligence (IJCAI-18), 2018, pp. 2326-2332.

Lipton et al., "Modeling Missing Data in Clinical Time Series with RNNs", Proceedings of Machine Learning for Healthcare 2016, JMLR W&C Track vol. 56, 17 pages.

Marshall et al., "Comparison of imputation methods for handling missing covariate data when fitting a Cox proportional hazards model: a resampling study", BMC Medical Research Methodology 2010, 10 pages.

Mazumder et al., "Spectral Regularization Algorithms for Learning Large Incomplete Matrices", Journal of Machine Learning Research 11 (2010), pp. 2287-2322.

Mell et al., "The NIST Definition of Cloud Computing", National Institute of Standards and Technology, Special Publication 800-145, Sep. 2011, pp. 1-7.

Ruiz et al., "The great multivariate time series classification bake off: a review and experimental evaluation of recent algorithmic advances", Data Mining and Knowledge Discovery (2021) 35, pp. 401-499.

Troyanskaya et al., "Missing value estimation methods for DNA microarrays", Bioinformatics, vol. 17 No. 6 2011, pp. 520-525.

Wolfe et al., "Interpolation of missing data values for audio signal restoration using a Gabor regression model", ICASSP 2005, pp. 517-520.

Yang et al., "Time-aware Subgroup Matrix Decomposition: Imputing Missing Data Using Forecasting Events", 2018 EEE International Conference on Big Data, pp. 1524-1533.

Zerveas et al., "A Transformer-Based Framework for Multivariate Time Series Representation Learning," arXiv:2010.02803v3 [cs.LG], Dec. 8, 2020, 20 pages.

Zhang, Zhongheng, "Missing data imputation: focusing on single imputation", Annals of Translational Medicine, Accepted for publication Dec. 8, 2015, pp. 1-8.

Zhou et al., "From Micro to Macro: Data Driven Phenotyping by Densification of Longitudinal Electronic Medical Records", KDD'14, Aug. 24-27, 2014, New York, NY, USA, 10 pages, http://dx.doi.org/10.1145/2623330.2623711.

* cited by examiner

ANOMALY DETECTION AND ANOMALOUS PATTERNS IDENTIFICATION

BACKGROUND

The present invention relates generally to the field of machine learning, and more particularly to detection of anomalous windows.

Anomaly detection is any process that finds the outliers of a dataset (i.e., items that do not belong in the dataset). There can be several types of techniques, such as unsupervised, supervised and semi-supervised. Unsupervised anomaly detection techniques detect anomalies in an unlabeled test data set under the assumption that the majority of the instances in the data set are normal by looking for instances that seem to fit least to the remainder of the data set.

Supervised anomaly detection techniques require a data set that has been labeled as "normal" and "abnormal" and involves training a classifier (the key difference to many other statistical classification problems is the inherent unbalanced nature of outlier detection).

Semi-supervised anomaly detection techniques construct a model representing normal behavior from a given normal training data set, and then test the likelihood of a test instance to be generated by the utilized model.

SUMMARY

Aspects of the present invention disclose a computer-implemented method, a computer system and computer program product for an end-to-end anomaly detection and anomalous patterns identification. The computer implemented method may be implemented by one or more computer processors and may include, classifying one or more sequential data; generating one or more vectors based on the one or more sequential data; clustering the one or more vectors into one or more clusters; determining a membership of the one or more vectors associated with the one or more clusters; updating the one or more clusters; and validating the one or more clusters with respect to a predefined threshold.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
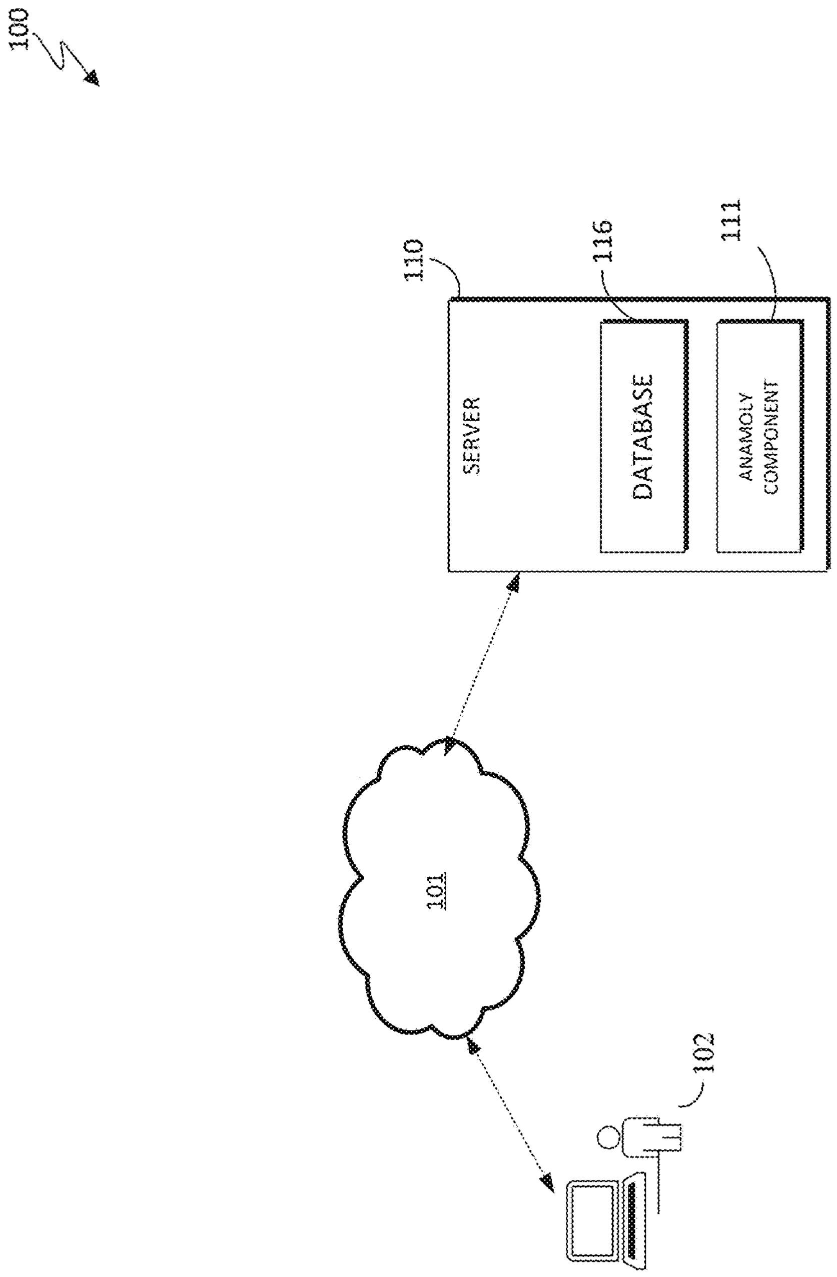
FIG. 1 is a functional block diagram illustrating anomaly detection environment, designated as 100, in accordance with an embodiment of the present invention.

The current state of art as it pertains methods/techniques for processing and managing anomalies (e.g., events, etc.) using machine learning, can present some unique challenges. In general, these methods can be categorized into classification-based, clustering-based, and hybrid approaches. For the classification-based approaches, they are highly dependent on the labels that are available. Usually, the labels are binary to indicate whether the data is anomaly or not. To detect more fine-grained anomalies, it requires to get the corresponding labels, which are usually time-consuming and labor-intensive to be acquired.

Conversely, for clustering-based approaches, it is flexible to derive different anomalous patterns automatically in an unsupervised manner. However, it will be hard to incorporate the prior experiences and the experts' knowledge. As a trade-off, some hybrid approaches have proposed to combine the supervised and unsupervised approaches. However, they usually mainly focus on improving the detection accuracy, while neglecting the importance of interpreting different anomalous patterns.

Other requirements to overcome the deficiencies can include, i) detecting anomalies based on previously tagged anomalous data (binary label I/O) where a learned model can be employed to detect anomaly in an early stage, the model can be a Multivariate Time-series Classification (MTC) problem, ii) identifying anomalous patterns in an unsupervised manner wherein the anomalous sequences may follow different patterns and iii) higher resolution (i.e., fine-grained detection) of the anomalous pattern where in the identification of the pattern help achieves a targeted diagnosis.

Embodiments of the present invention recognizes the deficiencies in the current state of art and proposes an approach to overcome those deficiencies. One approach, leverages the use of a GMM-LASSO (a selection operator-type, Lasso-type, generalized method of moments (GMM) estimator) algorithm and proposes a feedback loop where the window (i.e., anomalous window) is detected and then it is used to detect anomalous patterns. Afterwards, the approach validates the results by examining variation within generated abnormal clusters and repeating the initial step as a continuous improvement process.

The advantages of the approach can be summarized by the following paragraphs.

Relating to the first advantage, the approach enables users to achieve more fine-grained learning for various anomalous patterns via an unsupervised manner. Although based on supervised learning, users can distinguish abnormal time series from normal ones, it is a rough binary identification and cannot reflect different patterns for the abnormal data. Considering the fact that the anomalous data has diverse patterns, with multivariate playing different role in each pattern, and the treatments for different patterns are inconsistent, it is highly desired to identify more fine-grained anomalous patterns. Since these patterns can vary across different systems, manually tagging them requires lots of prior knowledge and experiences, which will be not only time-consuming but also effort-intensive. As a result, users aim to develop an unsupervised clustering manner to derive the anomalous patterns automatically.

Relating to the second advantage, based on the proposed framework, the users can learn anomalous clusters and select critical features inside each cluster simultaneously. There have been a lot of previous works proposed for either clustering the data to detect anomaly or selecting critical features to detect sparse latent effects of the anomalous data. However, there are few previous work taking advantage of both clustering and feature selection at the same time to derive the various anomalous patterns. Conducting feature selection concurrently with the clustering can filter out noisy and redundant data, which can lead to more accurate clustering results; meanwhile, narrowing down the input of feature selection via clustering can ensure more critical features being selected, which is mutually beneficial.

Relating to the third advantage, based on the feature selected for each cluster, the users can derive interpretations to better understand the various anomalous patterns. The feature selection results in each cluster can reflect the interactive variables to be anomalous simultaneously. Meanwhile, by introducing aggregated features from each variable, e.g., the average, maximum, and minimum values, users can also figure out whether a certain variable is too high/low in general or at a certain timestamp within a time-series.

Other advantages incidental to the main three advantages (recited in the prior paragraphs) can include, but it is not limited to, i) using previously detected anomalies as a ground truth to aid other algorithms classify anomalous behavior, ii) using a sliding window classifier to determine whether a window is anomalous or not according to the previously learned behavior, iii) the ability for the classifier to detect when previous anomalies are beginning to occur subsequently, providing an opportunity to detect them earlier and iv) the ability to cluster timeseries associated with an anomalous period that may or may not yet themselves be anomalous.

Other embodiments of the approach can include the following high level steps, i) receives a sequential dataset with one or more data points, ii) aggregating the sequential dataset into one or more vectors (e.g., positive and negative vectors), iii) initializing one or more clusters based on the one or more vectors (use K-means elbow), iv) calculating one or more probabilities that the one or more data points belongs to the one or more clusters, v) reassigning the calculated data points of the one or more data points to the one or more clusters and vi) selecting, using any known or existing regression techniques, one or more features based on one or more negative vectors of the one or more vectors.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the FIGURES are merely schematic and are not drawn to scale. It should also be understood that the same reference numerals are used throughout the FIGURES to indicate the same or similar parts.

FIG. 1 is a functional block diagram illustrating anomaly detection environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Anomaly detection environment 100 includes network 101 and client devices 102.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, client devices 102, primary Li-Fi device 103 and other computing devices (not shown) within Anomaly detection environment 100. It is noted that other computing devices can include, but is not limited to, client device 102 and any electromechanical devices capable of carrying out a series of computing instructions.

Client devices 102 are one or more computing devices that are capable of performing various tasks based on a set of instructions (i.e., computer programs). For example, a laptop with anomaly detection that is used to analyze IT operations and pinpoint anomaly detection.

Embodiment of the present invention can reside on server 110. Server 110 includes anomaly detection component 111 and database 116.

Anomaly detection component 111 provides the capability of, detecting anomalies by using a two-phase approach. The first phase includes a supervised methodology where the approach uses the previously detected anomalies as a ground truth to aid the algorithm to classify anomalous behavior. The second phase includes an unsupervised methodology where the approach uses an algorithm to cluster a timeseries associated with an anomalous period that may or may not yet become anomalous. This period may lend itself to point out which specific combination of variables is/becomes anomalous (i.e., feature selection during clustering).

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within Anomaly detection environment 100 via network 101. In another embodiment, server 110 represents a computing system utilizing clustered computers and components (e.g., database server computers, application server computers, etc.) that act as a single pool of seamless resources when accessed within anomaly detection environment 100.

Database 116 is a repository for data used by anomaly detection component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within Anomaly detection environment 100, provided that anomaly detection component 111 has access to database 116. Database 116 may store information associated with, but is not limited to, knowledge corpus of various regression techniques, clustering techniques, E-M techniques associated with GMM-LASSO, test dataset, training dataset, features selection techniques and anomalous windows detection techniques.

Figure 2A:
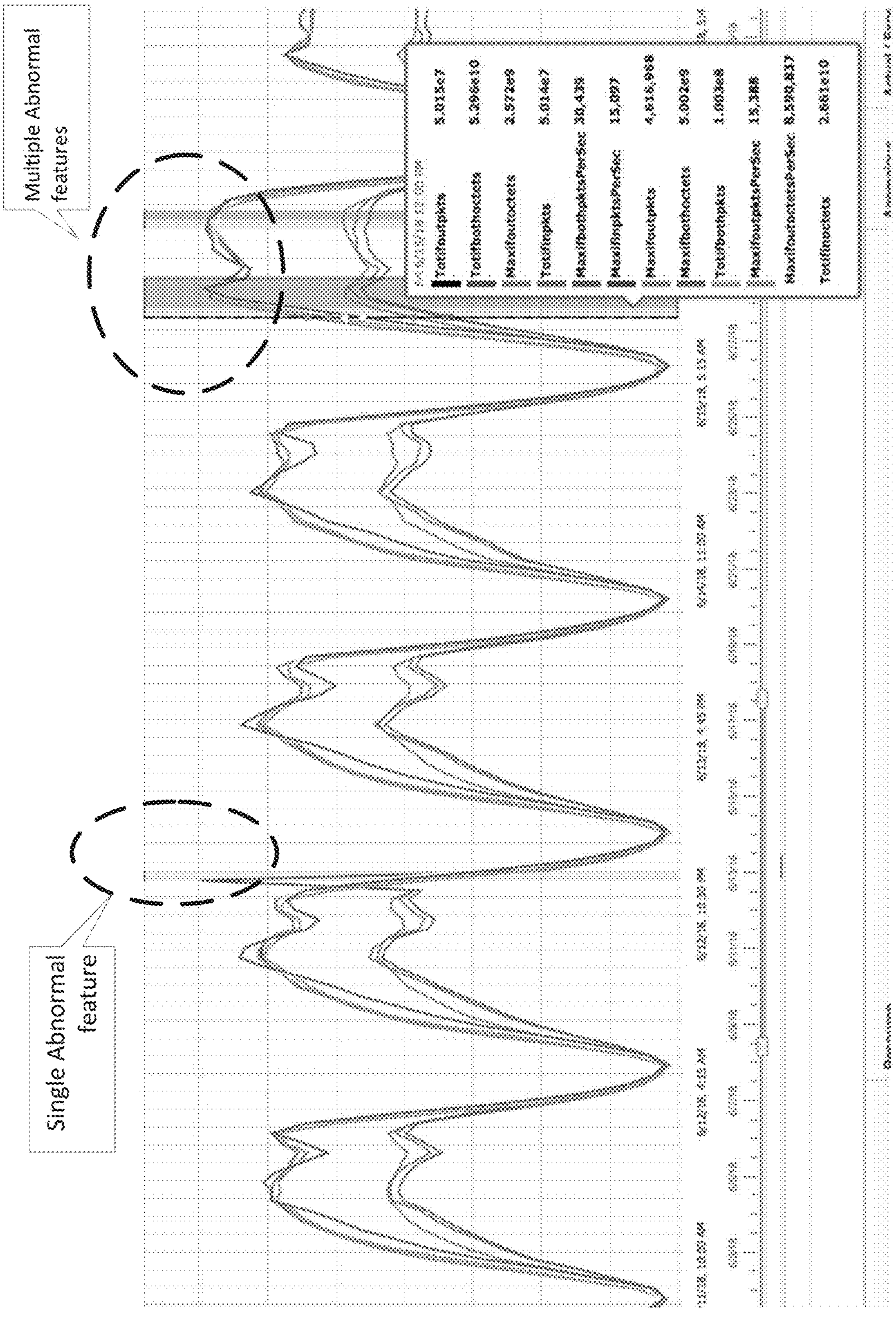
FIG. 2A is an example of a time series graph illustrating various transactions (e.g., logs, events, error tickets, etc.) of an IT system with one or more anomalies in accordance with an embodiment of the present invention.

FIG. 2A is an example of a time series graph illustrating various transactions (e.g., logs, events, error tickets, etc.) of an IT system (see FIG. 2B) with one or more anomalies in accordance with an embodiment of the present invention. A single abnormal features preceding multiple abnormal features may not trigger or become part of characteristics that any anomaly detection can handle. However, as previously mentioned in the advantages of the approach of the current embodiment, the single abnormal feature can be learned and become part of the aggregate dataset for which the approach can recognize as a predictor that multiple abnormal features will appear soon or will soon follow.

Figure 2B:
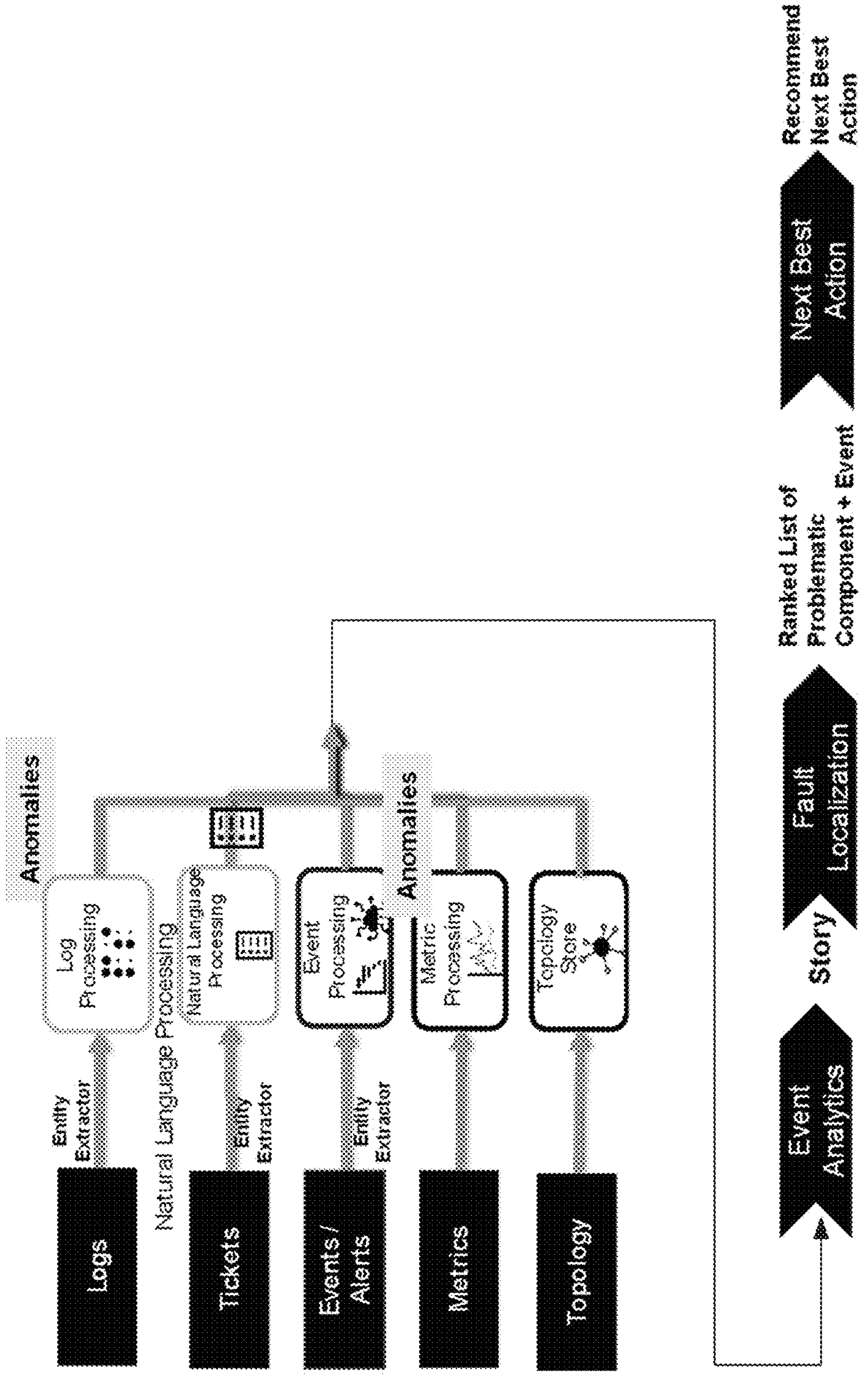
FIG. 2B is a block diagram illustrating events logging associated with a typical AIOps (Artificial Intelligence and Operations) of a business (i.e., banking), in accordance with an embodiment of the present invention.

FIG. 2B is a block diagram illustrating events logging associated with a typical AIOps (Artificial Intelligence and Operations) of a business (i.e., banking), in accordance with an embodiment of the present invention. There are several sources of raw data being gathered and logged by an AIOPs, such as, logs, tickets, events/alerts, metrics and topology, just to name a few. Generally, these time sequence raw data are further processed and converted into analytics friendly format. For example, if the source of the raw data is a text based, such as a complaint ticket format, it can be extracted by using NLP (natural language processing) or similar techniques before being aggregated along with other data for anomaly analysis. The first stage of processing the aggregated data, anomaly detection component 111 can determine fine grain detection of anomalies associated with events analytics. For example, it could be discovered that there is a correlation over a targeted set of events in a shorter targeted anomalous window (see "single abnormal feature" FIG. 2A). Based on the fine grain detection from event analytics, anomaly detection component 111 can also determine a more accurate fault localization (i.e., reduction of false positives and false negatives).

Figure 3:
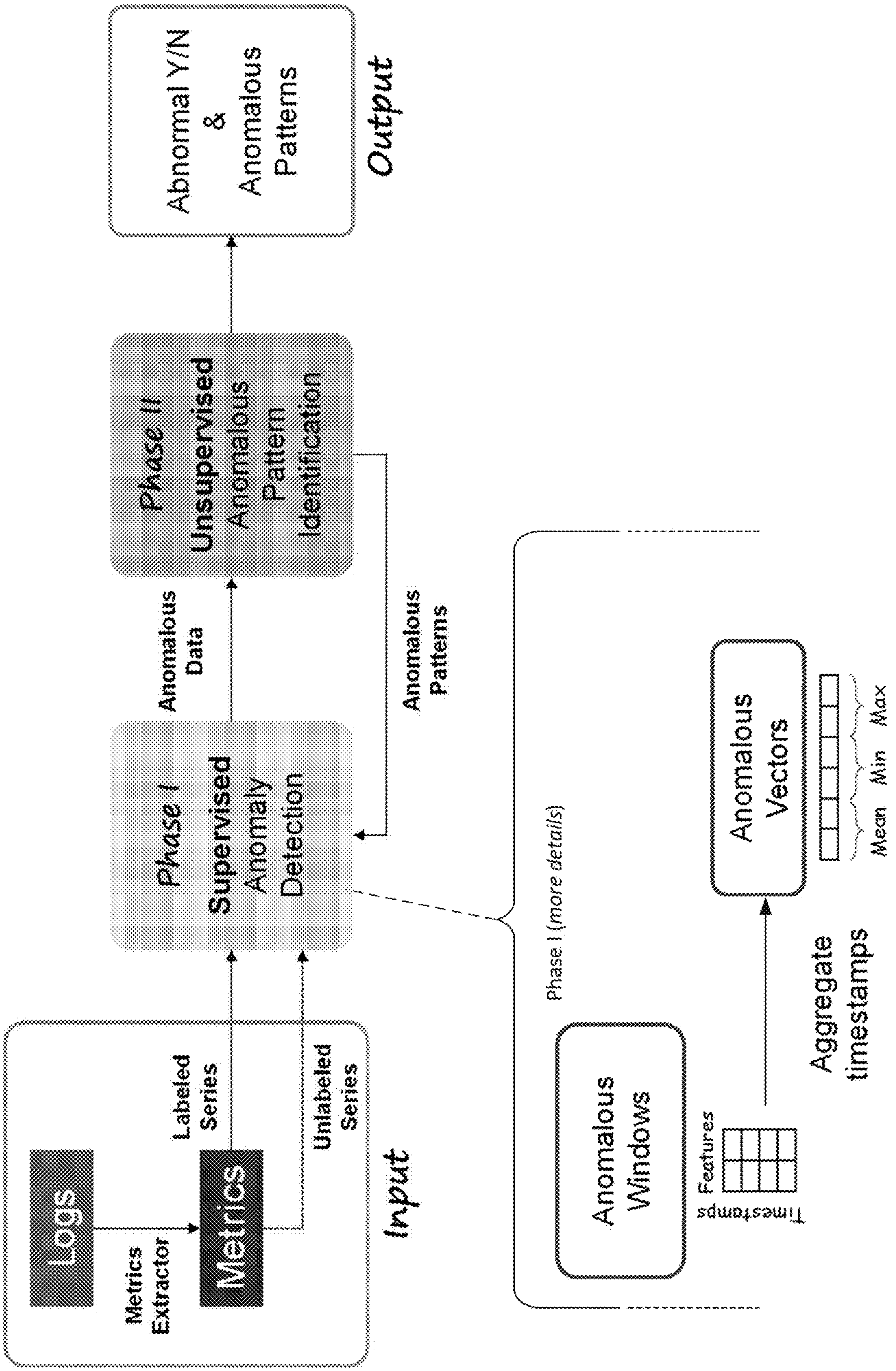
FIG. 3 is a block diagram illustrating a high-level functionality of the anomaly detection environment, in accordance with an embodiment of the present invention.

FIG. 3 is a block diagram illustrating a high-level functionality of the anomaly detection environment 100. There is a framework which contains two phases, including one phase of supervised anomaly detection, and another phase of unsupervised anomalous pattern identification. The input of the system is the metrics data, which are multi-variate time series. For other types of data, for example the logs, they can be transformed to metrics data first and then be fed into the system. From Phase I, system will have a rough classification for the anomaly data, then in phase II, system will derive different anomalous patterns. The derived patterns can be fed back to phase I to further improve the detection accuracy. In order to get more input data for Phase II to learn more general clusters, system can apply the large amount of unlabeled data to the model that was learned from phase I. Then given a test data, the output of the system will be not only a binary label, but also the patterns corresponding to the data.

Figure 4:
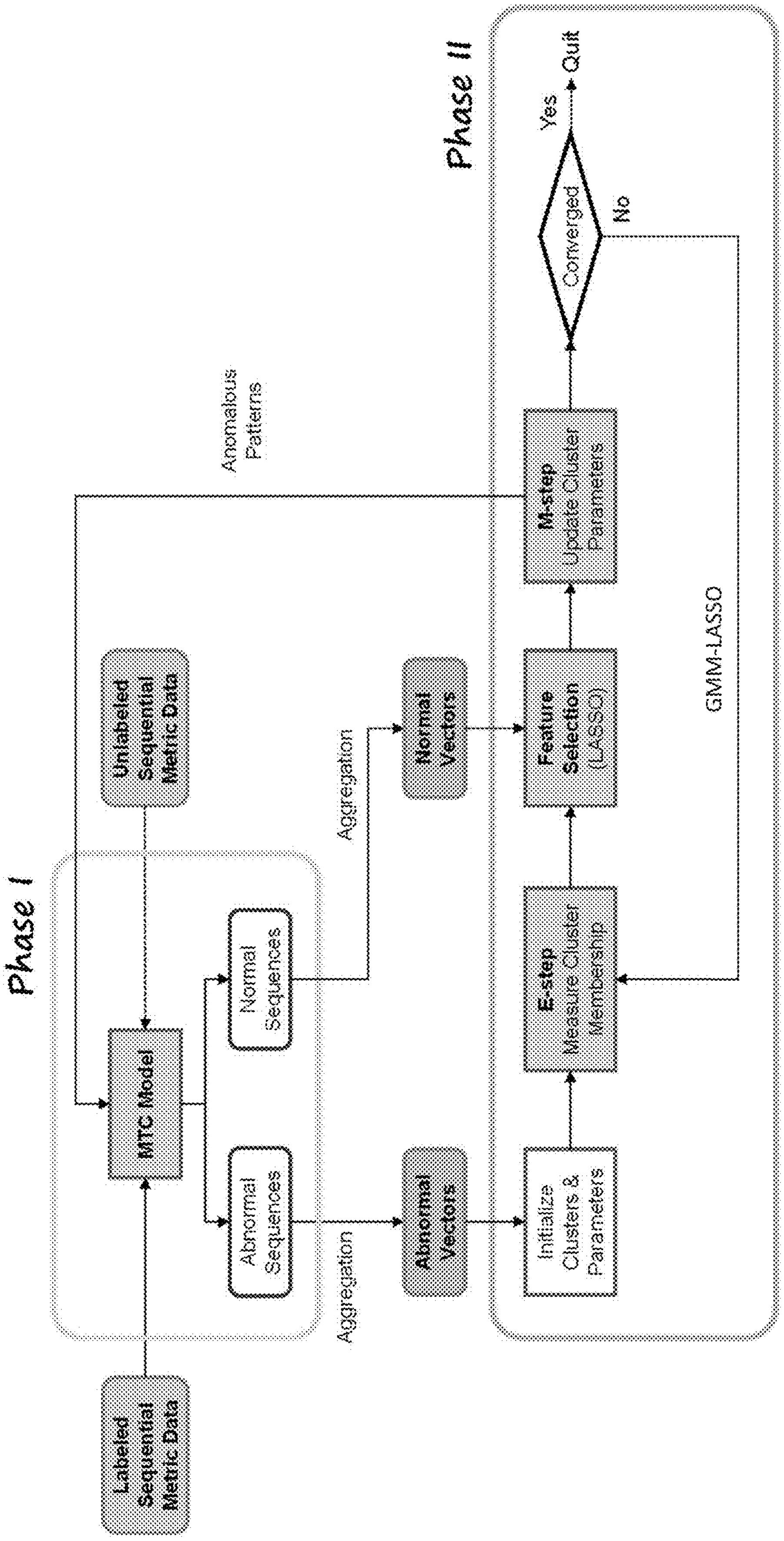
FIG. 4 is a block diagram illustrating a more detail functionality of FIG. 3, in accordance with an embodiment of the present invention.

FIG. 4 is a block diagram illustrating a more detail functionality of FIG. 2. In phase I, a multi-variate time-series classification model is used, ROCKET (Random Convolutional Kernel Transform). Then in phase II, a method called GMM-LASSO, which can cluster the data and select critical features from each cluster, simultaneously is used.

An example of a pseudocode of the GMM-LASSO algorithm will be provided below:

Input: Abnormal & Normal sequences (classified by MTC Model)

Step 1: Aggregate sequences into vectors $$\{A_m\}_{m=1}^{M} \text{ and } \{N_n\}_{n=1}^{N}$$

(e.g., average, max, min)

Step 2: Initialize cluster number K (e.g., K-means elbow) and clusters $$\left\{\mu_k, \sum\nolimits_k\right\}_{k=1}^{K} \text{ given } \{A_m\}_{m=1}^{M}$$

Step 3: Calculate probabilities $w_{mk}$ to reassign clusters:

$$w_{mk} = \frac{P(A_m|k)}{\sum_{k=1}^{K} P(A_m|k)} = \frac{f_{N(\mu_k,\Sigma_k)}(A_m)}{\sum_{k=1}^{K} f_{N(\mu_k,\Sigma_k)}(A_m)}$$

Step 4: E-step: Calculate mean and variance, i.e., $\mu_k$, $\Sigma_k$, for each cluster:

$$\mu_k = \frac{1}{M}\sum\nolimits_{m=1}^{M} w_{mk}\overline{A}_m$$

$$\Sigma_k = \frac{1}{M}\sum\nolimits_{m=1}^{M} (\overline{A}_m - \mu_k)(\overline{A}_m - \mu_k)^T$$

Step 5: Feature selection by LASSO $\{A_m, N_n\} \rightarrow \{\overline{A_m}, \overline{N_n}\}$ Step 6: M-step: updating the mean and variance (estimated in steps 3-4)

Step 7: Repeat Steps 3-6, until the log likelihood can/has converged (i.e., variation is below a pre-defined threshold, or the maximum iteration number has been reached)

Output: Abnormal clusters and critical features for each cluster

Step 1 can be further explained, wherein the aggregated positive and negative vectors $$\left(\text{e.g., } \{A_m\}_{m=1}^{M} \text{ and } \{N_n\}_{n=1}^{N}\right)$$

are denoted as capital A and N, respectively. The aggregation can be conducted by mean, max, min, etc.

Step 2 can be further explained, wherein the initial cluster number was determined by checking the K-means elbow. The mean and standard deviation for each cluster k is denoted as (μ) mu and (Σ) sigma.

Step 3 can be further explained, wherein the algorithm calculates the probabilities $w_{mk}$ for each abnormal data $A_m$ and each cluster k. Each cluster is modeled as a normal distribution function, parameterized by (μ) mu and (Σ) sigma.

Step 4 can be further explained, wherein the E-Step calculation is based on the E-M (Expectation-Maximization) technique. E-M is a statistical algorithm for finding the right model parameters. E-M is used when the data has missing values, or in other words, when the data (e.g., missing mean, theta and variance, sigma) is incomplete. Expectation-Maximization is not one technique but is based on many/multiple algorithms and/or techniques, including the Gaussian Mixture Models. Generally, the E-M algorithm has two steps:

E-step: In this step, the available data is used to estimate (guess) the values of the missing variables (e.g., such as mean and variance)

M-step: Based on the estimated values generated in the E-step, the complete data is used to update the parameters (e.g., such as mean and variance)

Step 5 can be further explained, wherein the algorithm incorporated the negative vectors and use LASSO to select the features.

Step 6 can be further explained, wherein (μ) mu and (Σ) sigma were updated.

The output can be further explained, wherein the output of the model are the learned abnormal clusters and the critical features selected for each cluster.

Figure 5:
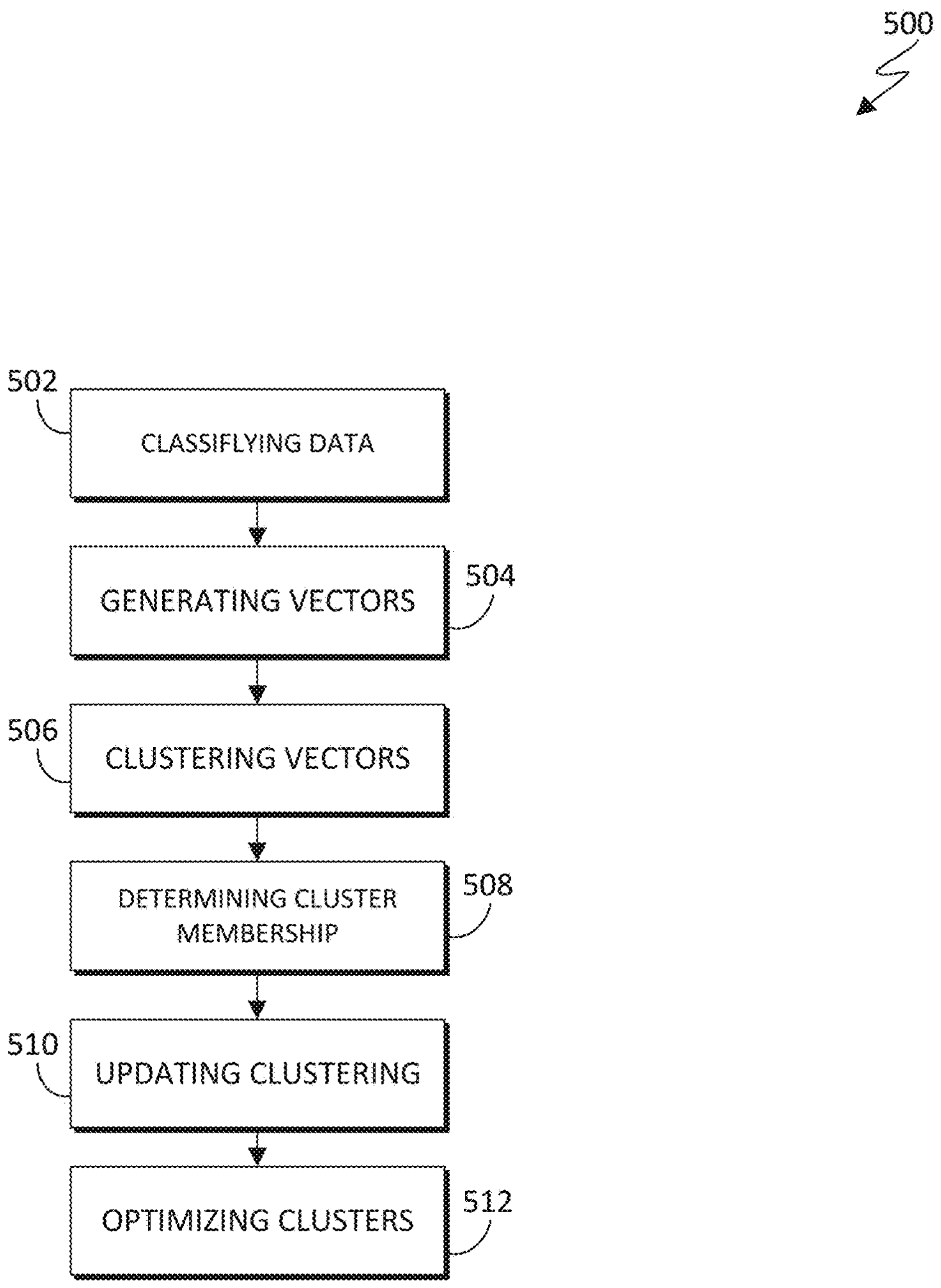
FIG. 5 is a high-level flowchart illustrating the anomaly detection component 111, designated as 500, in accordance with another embodiment of the present invention.

FIG. 5 is a high-level flowchart illustrating the anomaly detection component 111, designated as 500.

Anomaly detection component 111 classifies data (step 502). In an embodiment, anomaly detection component 111, receives raw a dataset (e.g., labeled and unlabeled sequential series) and begins to classify and label the dataset. The raw data can come from routine business operations, such as banking IT (information technology) operations (see FIG. 2 and FIG. 6), where events and transactions are continuously recorded and monitored for smooth operations. Classification and labeling by anomaly detection component 111 can be performed by leverage existing techniques, such as, ROCKET, known in the art (see Phase I of FIG. 3 or FIG. 4).

Anomaly detection component 111 can classify sequential data (timestamp of events) of the dataset into normal and abnormal sequences using ground truth data. The classification of data can be performed by a MTC (Multivariate Time-series Classification) model technique or similar methods (refer to Phase I of FIG. 3 or FIG. 4).

Anomaly detection component 111 generates vectors (step 504). In an embodiment, anomaly detection component 111 generates abnormal vectors from the abnormal sequences and generates normal vectors from the normal sequences. For example, normal sequences means that the algorithm has been classified as "positive" vectors (refer to $$\{A_m\}_{m=1}^{M}$$

from the GMM-LASSO pseudocode section) and these vectors exhibit normal system behavior. Abnormal sequences means that the algorithm has been classified as "negative" vectors (refer to $$\{N_n\}_{n=1}^{N}$$

from the GMM-LASSO pseudocode section) and the negative vectors exhibit abnormal system behaviors, such as, the system is experiencing some problems and/or issues.

After generating the vectors ($A_m$ and $N_n$), anomaly detection component 111 aggregates the normal and abnormal vector sequences. Aggregating can be defined as performing mathematic operations such as, but is not limited to, determining the average, maximum or minimum.

Anomaly detection component 111 clusters the vectors (step 506). In an embodiment, anomaly detection component 111 clusters the abnormal vectors, wherein the abnormal vectors include certain parameters. Anomaly detection component 111 initializes the clusters, wherein the cluster number and parameters relating the cluster and/or dataset (e.g., abnormal vector sequence, etc.). The number of clusters can be determined by checking the K-means elbow. It is noted that other methods and techniques may be employed to determine the number of clusters besides K-means elbow (i.e., centroid-based clustering), for example, hierarchical clustering, distribution based clustering (i.e., EM-GMM), density-based clustering and grid-based clustering.

Anomaly detection component 111 determine the cluster membership (step 508). In an embodiment, anomaly detection component 111, determines the cluster membership of the abnormal vectors. Determining/assigning cluster membership of the vectors can be performed by various methods or a combination of methods (e.g., E-M technique and probability function, etc.) In one embodiment, abnormal detection component 111 calculates the probability function, $w_{mk}$, to determine and assign vectors membership to the clusters. Furthermore, the probability function, $w_{mk}$, can be recalculated again to reassign those same vectors membership to the clusters (assuming the calculation changes/updates). The function, $w_{mk}$, is the probability function for determining cluster membership of the vectors, for example, each abnormal vector ($A_m$) and each cluster, k. It is noted that each cluster is modeled as a normal distribution parameterized by mu and sigma.

In another embodiment abnormal detection component 111 uses an E-M (Expectation-Maximization) technique which is part of GMM (Gaussian Mixture Models) to determine the initial variables and parameters (e.g., mean, variance, etc.) for the cluster memberships.

In yet another embodiment, determining cluster membership can leverage log likelihood technique for computing cluster memberships.

Furthermore, in this step, the normal vectors ($N_n$) are feature selected and incorporated with the abnormal vectors into the clusters by using LASSO technique (see FIG. 4).

Anomaly detection component 111 updates the clustering (step 510). In an embodiment, anomaly detection component 111, updates the clustering of the abnormal vectors using based on the M-step of the E-M (Expectation-Maximization) method. Updating the clustering includes updating the parameters that were first initialized and/or guessed in the E-step of the E-M technique (step 508).

Anomaly detection component 111 optimizes the clusters (step 512). In an embodiment, anomaly detection component 111, optimizes the updated abnormal clusters by examining the variation of the abnormal cluster distribution with respect to a predefined threshold (determined by the user or the AI of the system). Essentially, optimizing the cluster is looking for convergence of the parameters by comparing against the predetermined/predefined threshold (i.e., exit criteria). The predetermined threshold can consist of, a numerical value, time-based duration (e.g., epoch, user defined time frame, etc.) or etc. The process of step 508 through step 510 repeats until convergence occurs.

In another embodiment, the high level steps of anomaly detection component 111 can be summarized as, i) receive a dataset (i.e., anomalous window) that can be classified by ROCKET into abnormal and normal sequences, ii) aggregate the data inside each anomalous window from the dataset, iii) initialize the number of clusters that may apply to the given dataset, iv) apply the feature selection method (e.g. LASSO, RPC, SVD) to select the critical features, v) compute the mean and standard deviation based on the selected features, vi) compute Log Likelihood for Cluster Membership, vii) re-assign the data to the clusters and viii) repeat steps (iii) to (iv) until convergence to a stable value of the data (i.e., variation between different iterations is smaller than a pre-defined threshold).

In yet another embodiment, the high level steps of anomaly detection component 111 can be summarized as, i) classifying sequential data into normal and abnormal sequences using ground truth data, ii) generating abnormal vectors from the abnormal sequences and generating normal vectors from the normal sequences, iii) clustering the abnormal vectors, wherein the abnormal vectors include certain parameters, iv) determining the cluster membership of the abnormal vectors, v) updating the clustering of the abnormal vectors using features of the normal vectors and vi) validating the updated abnormal clusters by examining the variation of the abnormal cluster distribution with respect to a predefined threshold.

Figure 6:
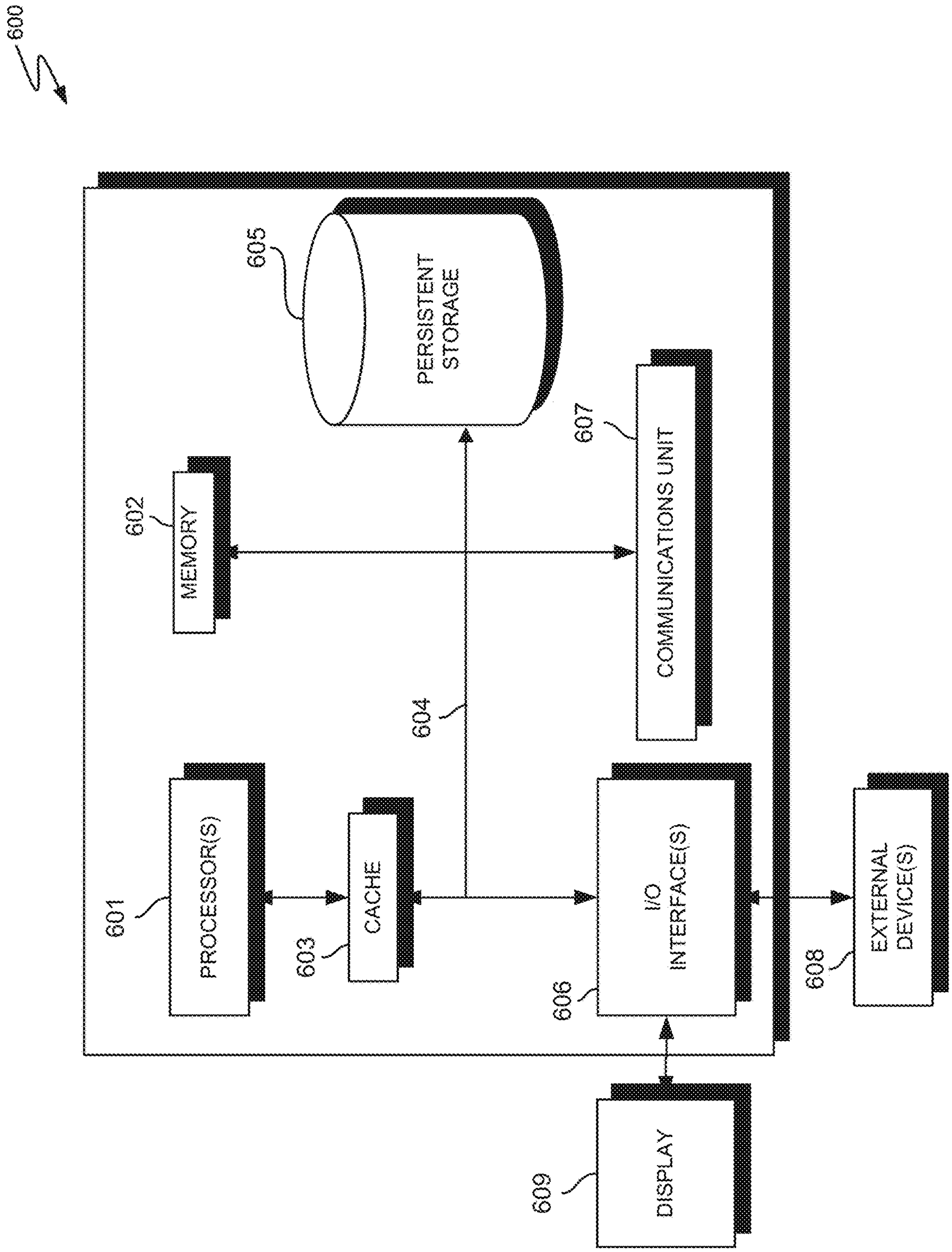
FIG. 6 depicts a block diagram, designated as 600, of components of a server computer capable of executing the anomaly detection component 111 within the anomaly detection environment 100, in accordance with an embodiment of the present invention.

FIG. 6, designated as 600, depicts a block diagram of components of Anomaly Detection component 111 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data ×10) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Anomaly detection component 111 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., Anomaly detection component 111) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., Anomaly detection component 111) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for an end-to-end anomaly detection and anomalous patterns identification in multivariate time-series metrics data, end-to-end detection of anomalous windows and identification of anomalous patterns in multivariate time-series metrics data, computer-implemented method executed by one or more processors comprising:

- receiving multivariate time-series metrics data collected from one or more computing systems over time;
- segmenting the multivariate time-series metrics data into time-bounded windows, each window comprising a plurality of timestamped metric values;
- classifying, by a multivariate time-series classification model trained using labeled ground-truth windows, each time-bounded window as normal or anomalous;
- aggregating metric values within each anomalous window into abnormal feature vectors by computing, for each metric dimension, one or more statistical features comprising at least one of a mean value, a maximum value, or a minimum value;
- initializing a plurality of anomalous pattern clusters by applying a clustering initialization technique to the abnormal feature vectors, each cluster defined by probabilistic parameters comprising a mean and a variance;
- iteratively determining cluster membership probabilities for the abnormal feature vectors using a Gaussian mixture model (GMM) by executing (i) an expectation step that computes, for each abnormal feature vector of the abnormal feature vectors, a probability of membership in each cluster based on the probabilistic parameters and (ii) a maximization step that updates the probabilistic parameters using the determined cluster membership probabilities;
- performing feature selection during the iterative clustering initialization technique using a LASSO-based regression technique that incorporates feature values from the abnormal feature vectors and normal feature vectors to identify metric dimensions contributing to each anomalous pattern cluster associated with the plurality of anomalous pattern clusters; and
- terminating the iterative clustering initialization technique in response to a convergence condition being satisfied by comparing variation of the probabilistic parameters across iterations to a predefined threshold, and outputting the plurality of anomalous pattern clusters and associated critical features characterizing distinct anomalous behaviors.

2. The computer-implemented method of claim 1, wherein classifying each time-bounded window as normal or anomalous comprises applying a Random Convolutional Kernel Transform (ROCKET) multivariate time-series classification model trained using labeled anomalous windows.

3. The computer-implemented method of claim 1, wherein the computer-implemented method further comprises generating normal feature vectors from windows classified as normal, and wherein the normal feature vectors are used during the feature selection associated with the LASSO-based regression technique to suppress non-discriminative metric dimensions.

4. The computer-implemented method of claim 1, wherein initializing the plurality of anomalous pattern clusters comprises determining a cluster count using a K-means elbow technique applied to the abnormal feature vectors prior to the determined Gaussian mixture model.

5. The computer-implemented method of claim 1, wherein determining the cluster membership probabilities comprises calculating, for each abnormal feature vector of the abnormal feature vectors, a normalized likelihood value based on a multivariate normal distribution parameterized by the mean and variance associated with the plurality of anomalous pattern clusters.

6. The computer-implemented method of claim 1, wherein updating the probabilistic parameters of the plurality of anomalous pattern clusters is performed by the maximization step of an expectation-maximization (EM) algorithm that maximizes a log-likelihood function for the abnormal feature vectors.

7. The computer-implemented method of claim 1, wherein the convergence condition is satisfied when a change in at least one of the mean or variance associated with the plurality of anomalous pattern clusters between successive iterations falls below the predefined threshold.

8. The computer-implemented method of claim 1, wherein the predefined threshold comprises at least one of (i) a numerical log-likelihood variation value or (ii) a maximum iteration count defining a time-bounded training duration.

9. A computer program product for end-to-end anomaly detection and anomalous patterns identification, the computer program product comprising:

- one or more computer readable storage media and program instructions stored on the one or more computer readable storage media, the program instructions comprising the steps of:
- receiving multivariate time-series metrics data collected from one or more computing systems over time;
- segmenting the multivariate time-series metrics data into time-bounded windows, each window comprising a plurality of timestamped metric values;
- classifying, by a multivariate time-series classification model trained using labeled ground-truth windows, each time-bounded window as normal or anomalous;
- aggregating metric values within each anomalous window into abnormal feature vectors by computing, for each metric dimension, one or more statistical features comprising at least one of a mean value, a maximum value, or a minimum value;
- initializing a plurality of anomalous pattern clusters by applying a clustering initialization technique to the abnormal feature vectors, each cluster defined by probabilistic parameters comprising a mean and a variance;

iteratively determining cluster membership probabilities for the abnormal feature vectors using a Gaussian mixture model (GMM) by executing (i) an expectation step that computes, for each abnormal feature vector of the abnormal feature vectors, a probability of membership in each cluster based on the probabilistic parameters and (ii) a maximization step that updates the probabilistic parameters using the determined cluster membership probabilities;

performing feature selection during the iterative clustering initialization technique using a LASSO-based regression technique that incorporates feature values from the abnormal feature vectors and normal feature vectors to identify metric dimensions contributing to each anomalous pattern cluster associated with the plurality of anomalous pattern clusters; and terminating the iterative clustering initialization technique in response to a convergence condition being satisfied by comparing variation of the probabilistic parameters across iterations to a predefined threshold, and outputting the plurality of anomalous pattern clusters and associated critical features characterizing distinct anomalous behaviors.

10. The computer program product of claim 9, wherein classifying each time-bounded window as normal or anomalous comprises applying a Random Convolutional Kernel Transform (ROCKET) multivariate time-series classification model trained using labeled anomalous windows.

11. The computer program product of claim 9, wherein the steps further comprising:

generating normal feature vectors from windows classified as normal, and wherein the normal feature vectors are used during the feature selection associated with the LASSO-based regression technique to suppress non-discriminative metric dimensions.

12. The computer program product of claim 9, wherein initializing the plurality of anomalous pattern clusters comprises determining a cluster count using a K-means elbow technique applied to the abnormal feature vectors prior to the determined Gaussian mixture model.

13. The computer program product of claim 9, wherein determining the cluster membership probabilities comprises calculating, for each abnormal feature vector of the abnormal feature vectors, a normalized likelihood value based on a multivariate normal distribution parameterized by the mean and variance associated with the plurality of anomalous pattern clusters.

14. The computer program product of claim 9, wherein updating the probabilistic parameters of the plurality of anomalous pattern clusters is performed by the maximization step of an expectation-maximization (EM) algorithm that maximizes a log-likelihood function for the abnormal feature vectors.

15. The computer program product of claim 9, wherein the convergence condition is satisfied when a change in at least one of the mean or variance associated with the plurality of anomalous pattern clusters between successive iterations falls below the predefined threshold.

16. The computer program product of claim 9, wherein the predefined threshold comprises at least one of (i) a numerical log-likelihood variation value or (ii) a maximum iteration count defining a time-bounded training duration.

17. A computer system for end-to-end anomaly detection and anomalous patterns identification, the computer system comprising:

one or more computer processors;

one or more computer readable storage media; and program instructions stored on the one or more computer readable storage media for execution by at least one of the one or more computer processors, the program instructions comprising the steps of:

receiving multivariate time-series metrics data collected from one or more computing systems over time;

segmenting the multivariate time-series metrics data into time-bounded windows, each window comprising a plurality of timestamped metric values;

classifying, by a multivariate time-series classification model trained using labeled ground-truth windows, each time-bounded window as normal or anomalous;

aggregating metric values within each anomalous window into abnormal feature vectors by computing, for each metric dimension, one or more statistical features comprising at least one of a mean value, a maximum value, or a minimum value;

initializing a plurality of anomalous pattern clusters by applying a clustering initialization technique to the abnormal feature vectors, each cluster defined by probabilistic parameters comprising a mean and a variance;

iteratively determining cluster membership probabilities for the abnormal feature vectors using a Gaussian mixture model (GMM) by executing (i) an expectation step that computes, for each abnormal feature vector of the abnormal feature vectors, a probability of membership in each cluster based on the probabilistic parameters and (ii) a maximization step that updates the probabilistic parameters using the determined cluster membership probabilities;

performing feature selection during the iterative clustering initialization technique using a LASSO-based regression technique that incorporates feature values from the abnormal feature vectors and normal feature vectors to identify metric dimensions contributing to each anomalous pattern cluster associated with the plurality of anomalous pattern clusters; and terminating the iterative clustering initialization technique in response to a convergence condition being satisfied by comparing variation of the probabilistic parameters across iterations to a predefined threshold, and outputting a plurality of anomalous pattern clusters and associated critical features characterizing distinct anomalous behaviors.

18. The computer system of claim 17, wherein classifying each time-bounded window as normal or anomalous comprises applying a Random Convolutional Kernel Transform (ROCKET) multivariate time-series classification model trained using labeled anomalous windows.

19. The computer system of claim 17, wherein the steps further comprising:

generating normal feature vectors from windows classified as normal, and wherein the normal feature vectors are used during the feature selection associated with the LASSO-based regression technique to suppress non-discriminative metric dimensions.

20. The computer system of claim 17, wherein initializing the plurality of anomalous pattern clusters comprises determining a cluster count using a K-means elbow technique applied to the abnormal feature vectors prior to the determined Gaussian mixture model.

* * * * *